United States Patent
Golding

(10) Patent No.: US 11,621,931 B2
(45) Date of Patent: Apr. 4, 2023

(54) PERSONALITY-PROFILED LANGUAGE MODELING FOR BOT

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

(*) Notice: Subject to any disclaimer, the term of this patent is extended or adjusted under 35 U.S.C. 154(b) by 130 days.

(21) Appl. No.: 17/182,220

(22) Filed: Feb. 22, 2021

(65) Prior Publication Data

US 2021/0288926 A1 Sep. 16, 2021

Related U.S. Application Data

(60) Provisional application No. 62/988,265, filed on Mar. 11, 2020.

(51) Int. Cl.
| | |
|---|---|
| *H04L 51/02* | (2022.01) |
| *G10L 15/183* | (2013.01) |
| *G10L 25/30* | (2013.01) |
| *G06N 3/04* | (2023.01) |
| *G06N 3/006* | (2023.01) |
| *G10L 15/22* | (2006.01) |
| *G06Q 50/26* | (2012.01) |

(52) U.S. Cl.
CPC .............. *H04L 51/02* (2013.01); *G06N 3/006* (2013.01); *G06N 3/04* (2013.01); *G06Q 50/265* (2013.01); *G10L 15/183* (2013.01); *G10L 15/22* (2013.01); *G10L 25/30* (2013.01)

(58) Field of Classification Search
CPC ...... H04L 51/02; G06N 3/006; G06Q 50/265; G10L 15/183; G10L 15/22
See application file for complete search history.

(56) References Cited

U.S. PATENT DOCUMENTS

| | | | |
|---|---|---|---|
| 9,747,384 B1* | 8/2017 | Rao | G06F 16/972 |
| 9,812,151 B1* | 11/2017 | Amini | G06T 13/40 |
| 9,984,062 B1* | 5/2018 | Strope | G06F 16/31 |
| 10,049,103 B2* | 8/2018 | Perez | G10L 25/30 |
| 10,679,012 B1* | 6/2020 | Salimov | G06F 40/30 |
| 10,713,435 B1* | 7/2020 | Sreedharan | G06F 40/279 |
| 10,853,717 B2* | 12/2020 | Abramson | G06N 20/00 |
| 10,958,663 B2* | 3/2021 | Simons | H04L 9/3239 |
| 11,093,711 B2* | 8/2021 | Iida | G06K 9/6223 |
| 11,146,512 B1* | 10/2021 | Gozzo | H04L 51/212 |
| 11,184,298 B2* | 11/2021 | Freed | G06K 9/6218 |
| 11,238,226 B2* | 2/2022 | Vozila | G06F 40/35 |
| 2018/0203848 A1* | 7/2018 | Perez | G10L 25/30 |
| 2019/0163735 A1* | 5/2019 | Xu | G06N 3/0445 |
| 2019/0236139 A1* | 8/2019 | DeFelice | G06F 40/56 |
| 2019/0281066 A1* | 9/2019 | Simons | G06N 20/00 |
| 2020/0098366 A1* | 3/2020 | Chakraborty | G06N 3/006 |
| 2020/0402153 A1* | 12/2020 | Minkus | G06Q 50/188 |

(Continued)

*Primary Examiner* — Sargon N Nano
(74) *Attorney, Agent, or Firm* — Ferguson Braswell Fraser Kubasta PC

(57) ABSTRACT

A method uses personality-profiled language modeling for bots. An input phrase is received from a user. A language personality vector is determined using a language neural network and the input phrase. A response phrase to the input phrase is determined using the language personality vector from the language neural network. The response phrase is presented.

17 Claims, 7 Drawing Sheets

(56) References Cited

U.S. PATENT DOCUMENTS

| | | | | |
|---|---|---|---|---|
| 2020/0410983 | A1* | 12/2020 | Mohajer | G10L 13/00 |
| 2021/0166307 | A1* | 6/2021 | Goldberg | G06Q 30/06 |
| 2021/0256417 | A1* | 8/2021 | Kneller | G06N 3/088 |
| 2021/0365644 | A1* | 11/2021 | Mei | G06F 40/58 |
| 2022/0019856 | A1* | 1/2022 | Lee | G06N 3/082 |

* cited by examiner

| Response Look Up Table 300 | | | |
|---|---|---|---|
| | Travel 312 | Remodel Kitchen 314 | Reduce Debt 316 |
| Trait: adventure 302 | "Seize the day: book your dream vacation now!" 322 | "Treat yourself and wow your neighbors with an on-trend kitchen." 324 | "Pay off those fashion debts and hit the streets in style!" 326 |
| Trait: simplicity 304 | "Reduce the clutter of your life by going on vacation." 342 | "No more mess! Update your kitchen and organize – finally!" 344 | "3 debts, or 1? Simplify your debt now!" 346 |
| Trait: Introvert 306 | "Find your inner self: travel to a spiritual place." 362 | "Build an inner sanctum with a stone-finished kitchen." 364 | "You're not alone. Join others in paying off your debt and regaining control." 366 |

*Figure 3A*

PERSONALITY-PROFILED LANGUAGE MODELING FOR BOT

CROSS REFERENCE TO RELATED APPLICATIONS

This application claims the benefit of priority to U.S. Provisional Application 62/988,265, filed Mar. 11, 2020, which is hereby incorporated by reference herein.

BACKGROUND

Interactive voice response systems (as well as chat bots and other interactive systems) respond to natural language user inputs to perform tasks for a user. For example, a user may call a financial services provider to inquire about a loan and get a quote. Certain phrases and terms used in responses from the system may not encourage the user further interact with the system. A challenge is to provide responses that use phrases and terms that encourage the user to further interact with the system.

SUMMARY

In general, in one or more aspects, the disclosure relates to a method that uses personality-profiled language modeling for bots. An input phrase is received from a user. A language personality vector is determined using a language neural network and the input phrase. A response phrase to the input phrase is determined using the language personality vector from the language neural network. The response phrase is presented.

In general, in one or more aspects, the disclosure relates to a method that uses personality-profiled language modeling for bots. Authorization to access financial records of a user is received. A transaction personality vector is determined using a transaction neural network and the financial records. A response phrase is determined using the transaction personality vector. The response phrase is presented.

In general, in one or more aspects, the disclosure relates to a method that uses personality-profiled language modeling for bots. A feature data input is received. A feature personality vector is determined using a feature neural network and the feature data input. A response phrase to the feature data input is determined using the feature personality vector from the feature neural network. The response phrase is presented.

Other aspects of the invention will be apparent from the following description and the appended claims.

BRIEF DESCRIPTION OF DRAWINGS

FIG. 3A and FIG. 3B show examples in accordance with disclosed embodiments.

DETAILED DESCRIPTION

Figure 1A:
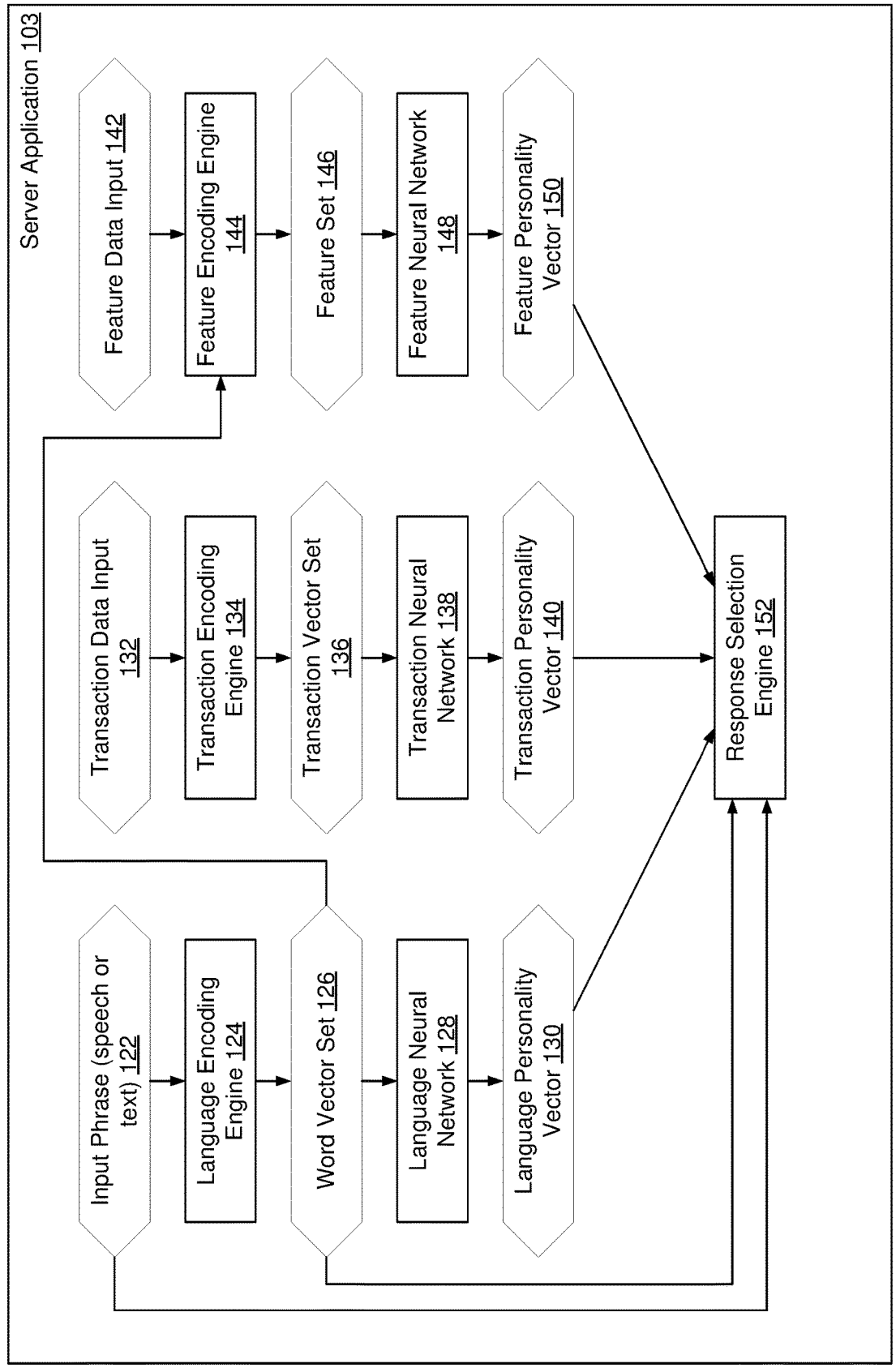
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, disclosed embodiments include systems and methods that identify a personality trait of a user and then communicate with the user based on the personality trait. For example, if the system identifies a user as having the personality trait of adventure, then the system may respond with the message "Seize the day: book your dream vacation now!". If the system identifies a user as having the personality trait of simplicity, then the system may respond with the message "Reduce the clutter of your life by going on vacation.".

The personality traits are part of a personality model. Examples of personality models include the five-factor model (FFM, also referred to as the OCEAN model) and the DISC model (described further below). The five-factor model includes the traits of Openness to experience (inventive/curious vs. consistent/cautious), Conscientiousness (efficient/organized vs. easy-going/careless), Extraversion (outgoing/energetic vs. solitary/reserved), Agreeableness (friendly/compassionate vs. challenging/detached), and Neuroticism (sensitive/nervous vs. secure/confident). The DISC model includes the four traits of dominance (D), influence (I), steadiness (S), and conscientiousness (C).

The system generates a personality vector that includes elements for each of the traits of the personality model being used. For example, the personality vector when using the five factor model has five elements that may be real numbers in the range of [0, 1] with numbers close to 0 indicating an absence of the trait and numbers close to 1 indicating a presence of the trait. Additionally, the sub-traits of the five factor model may also be used, which would increase the number of elements in the personality vector by the number of sub-traits.

The system generates personality vectors from input provided by a user. The input may be a phrase that is spoken by the user, provided in a text, provided in an email, etc. The input may also be generated from financial records to which the system has been authorized to access.

The system includes one or more machine learning algorithms that take the input data and output personality vectors. The machine learning algorithms may include neural networks that are trained with training data that includes labels to identify personality traits associated with the training data.

Figure 1B:
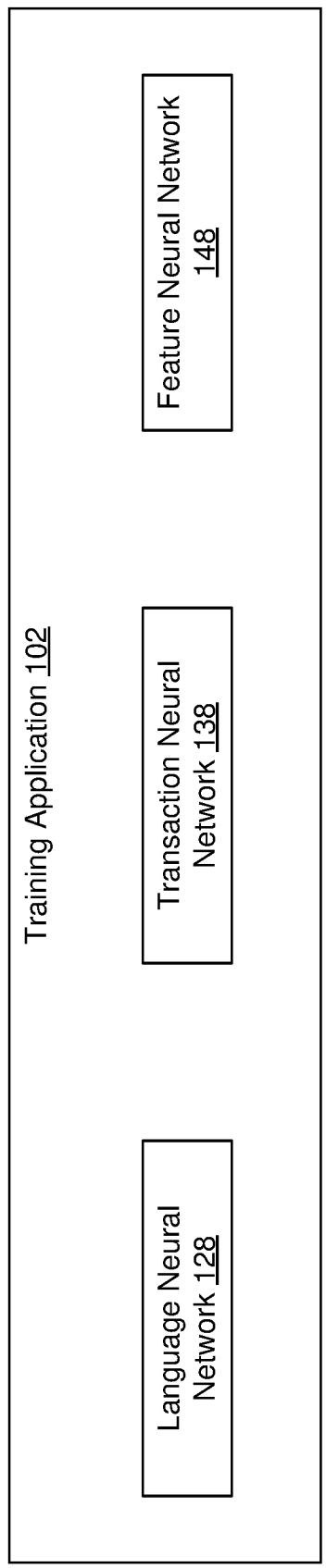
Figure 1C:
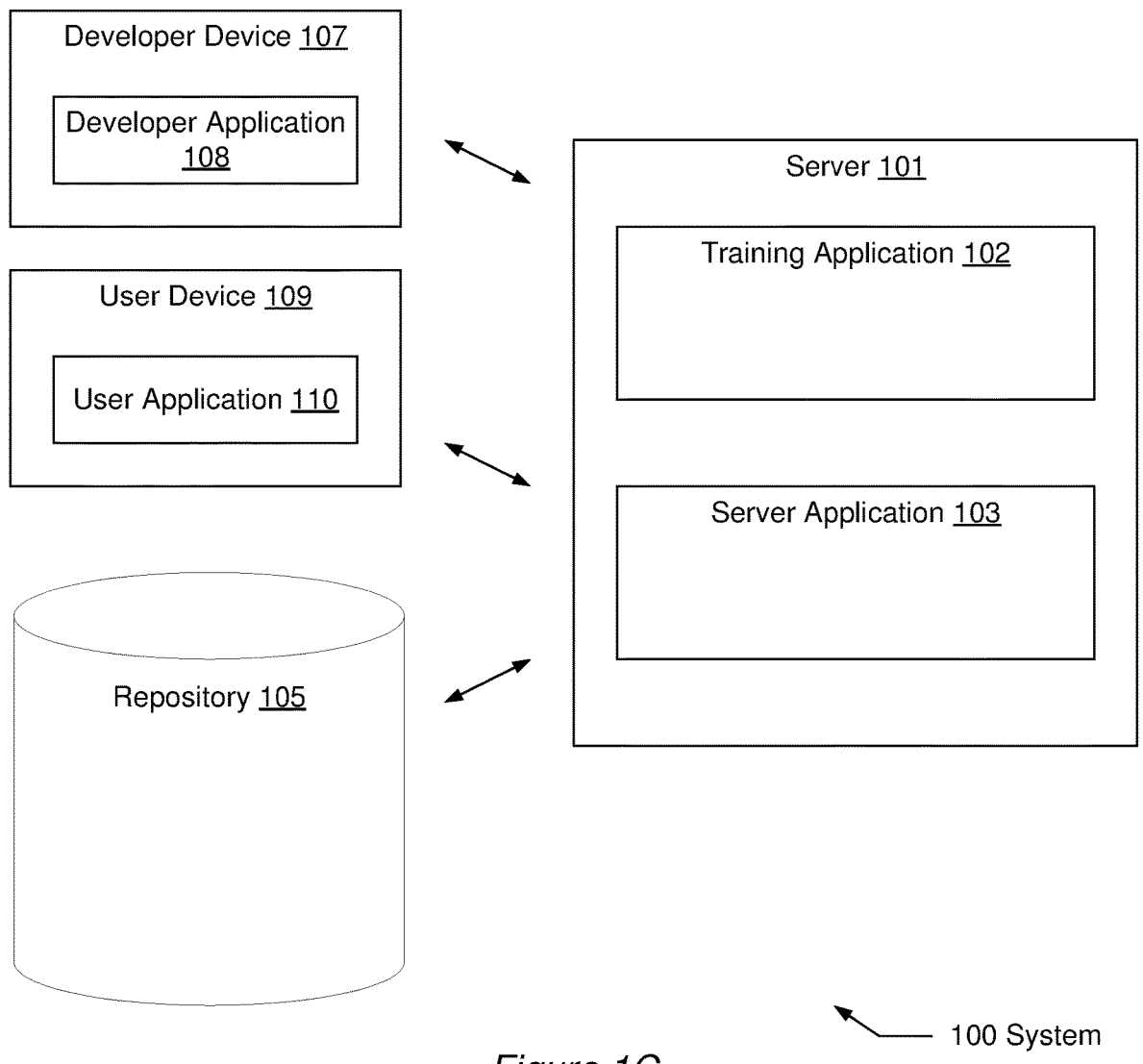

FIG. 1A, FIG. 1B, and FIG. 1C show diagrams of embodiments that are in accordance with the disclosure. The embodiments of FIG. 1A, FIG. 1B, and FIG. 1C may be combined and may include or be included within the features and embodiments described in the other figures of the application. The features and elements of FIG. 1A, FIG. 1B, and FIG. 1C are, individually and as a combination, improvements to the technology of machine learning. The various elements, systems, and components shown in FIG. 1A, FIG. 1B, and FIG. 1C may be omitted, repeated, combined, and/or altered as shown from FIG. 1A, FIG. 1B, and FIG. 1C. Accordingly, the scope of the present disclosure should not be considered limited to the specific arrangements shown in FIG. 1A, FIG. 1B, and FIG. 1C.

Turning to FIG. 1A, the server application (103) generates personality vectors that are used to generate responses and messages sent to a user of the system (100) of FIG. 1C. The server application (103) is a set of one or more programs executing on the server (101) that interacts with the user application (110) of the user device (109) of FIG. 1C. The server application (103) receives data about a user, generates personality vectors based on the data about the user, and generates responses to user inputs using the personality vectors. The server application (103) may generate different personality vectors based on different types of data from the user. For example, the language personality vector (130) is generated from the input phrase (122), the transaction personality vector (140) is generated from the transaction data input (132), and the feature personality vector (150) is generated from the feature data input (142).

The generation of a response by the server application (103) may be triggered by the receipt of the input phrase (122). Additional events may be used to trigger the server application (103) to generate a response without the receipt of a new input phrase. A periodic review of user records may identify multiple events that may each trigger the server application (103) to generate a response. Examples of events that may trigger a response include identifying that a loan has been abandoned and determining that a user has not interacted with the system (e.g., visited the website, used the mobile application, called customer service, etc.) within a threshold amount of time (e.g., within the last 30 days).

The input phrase (122) is a phrase of text provided by a user. The user may interact with the system by voice or text. With voice interaction, the speech of the user is converted to the text that is the input phrase (122). With text interaction, the text from messages or emails may form the text of the input phrase (122). The input phrase (122) may be input to the language encoding engine (124).

The language encoding engine (124) is a program of the server application (103). The language encoding engine (124) generates the word vector set (126) from the input phrase (122). The language encoding engine (124) may filter the input phrase (122) to remove extraneous words, convert the text to lower case, remove punctuation, etc. The language encoding engine (124) may then split the text into a vector of word integers with each word integer identifying a unique word in the vocabulary of words recognized by the system (100). The language encoding engine (124) may then convert the vector of word integers into a one hot vector set with each word integer being converted to a one hot vector. Each one hot vector may have a number of elements equal to the number of words in the vocabulary recognized by the system (100). For example, when the system includes a vocabulary of 10,000 words, a one hot vector would have 10,000 elements with one element set to 1 to identify a word of the vocabulary and the remaining elements set to 0. After converting the input phrase to a one hot vector set, the one hot vector set may be converted to the word vector set (126).

The word vector set (126) is a set of word vectors generated from the input phrase (122). Each word vector may have a number of elements that is less than the number of the one hot vectors. The elements of the word vectors may correspond to the meaning of a word represented by the word vector and are leaned as part of a machine learning algorithm (e.g., word2vec, GloVe, etc.). The word vector set (126) may be input to the language neural network (128) and may also be input to the feature encoding engine (144) and the response selection engine (152).

The language neural network (128) is a machine learning model that generates the language personality vector (130) from the word vector set (126). The language neural network (128) may include multiple layers and types of neural networks including convolutional neural networks, recurrent neural networks, translator networks, fully connected networks, etc., which may utilize one or more activation functions. As an example, the language neural network (128) may include multiple convolutional layers that feed into a two layer fully connected network that outputs the language personality vector (130).

The language personality vector (130) is a personality vector generated by the language neural network (128) from the input phrase (122). The language personality vector (130) may be input to the response selection engine (152).

The transaction data input (132) is financial data of one or more transactions of the user from financial records of the user. For example, the transaction data input (132) may be the banking transactions of the user over a finite period of time that the user authorizes access to, e.g., 6 months. The financial data for a transaction may include, a timestamp (date and/or time), an amount, and the payee. The financial data of the transaction data input (132) may also include additional information about the products (goods and services) purchased in the transaction identifying the products and unit prices of products. The transaction data input (132) may be input to the transaction encoding engine (134).

The transaction encoding engine (134) generates the transaction vector set (136) from the transaction data input (132). The transaction encoding engine (134) may categorize groups of payees, transaction amounts, and groups of products so that the user's actual purchase history may remain anonymous. For a transaction, the categorized financial data may be converted to one hot vectors, referred to as transaction vectors, that form the transaction vector set (136).

The transaction vector set (136) is a set of transaction vectors that represent one or more transactions from the transaction history of a user. As an example, if a transaction includes a timestamp, purchase amount, and payee, a transaction vector may include a one hot seven element vector for the day of the week (generated from the time stamp), a one hot four element vector for the transaction amount (e.g., for categories of less than $10, between $10 and $20, between $20 and $50, and above $50), and a one hot fifty element vector for the category of the type of payee (e.g., groceries, retail food, retail clothing, loan payment, etc.) forming a transaction vector with a total of 61 elements, with three elements being set to 1 and the remaining set to 0. The transaction vector set (136) may be input to the transaction neural network (138).

The transaction neural network (138) is a machine learning model that generates the transaction personality vector (140) from the transaction vector set (136). The transaction neural network (138) may include multiple layers and types of neural networks including convolutional neural networks, recurrent neural networks, translator networks, fully connected networks, etc., which may utilize one or more activation functions. As an example, the transaction neural network (138) may include multiple convolutional layers that feed into a two layer fully connected network that outputs the transaction personality vector (140).

The transaction personality vector (140) is a personality vector generated by the transaction neural network (138) from the transaction data input (132). The transaction personality vector (140) may be input to the response selection engine (152).

The feature data input (142) includes feature data that is extracted from the financial data used for the transaction data input (132). The feature data input (142) may correspond to an answer to a question that is asked of a user. For example, the user may be asked if they strongly agree or disagree with the statement "I eat out multiple times per month". Strongly agreeing with this statement may correspond to the trait of openness to experiences. Strongly agreeing with this statement may also correspond with a number of transactions at retail dining establishments being more than the number for an average user. A user that strongly agrees may have about 6 transactions per month at retail dining establishments as compared to an average user that may have about three transactions per month at retail dining establishments. The feature data input (142) may be a phrase spoken by a user (or word vector equivalent) that answers a question or a radio button selection (from a website) that answers the question. The feature data input (142) may be input to the feature encoding engine (144).

The feature encoding engine (144) generates the feature set (146) from the feature data input (142). When the feature data input (142) is a phrase spoken by the user, the feature encoding engine (144) may convert the answer to a categorical value. For example, the scale below may be used. The categorical score may be adjusted to a value between 0 and 1.

TABLE 1

| Answer | Score | Adjusted Value |
| --- | --- | --- |
| Disagree strongly | 1 | 0 |
| Disagree moderately | 2 | 0.167 |
| Disagree a little | 3 | 0.333 |
| Neither agree nor disagree | 4 | 0.5 |
| Agree a little | 5 | 0.667 |
| Agree moderately | 6 | 0.833 |
| Agree Strongly | 7 | 1 |

When the system (100) is authorized to access the user's financial records, the system (100) may identify the number of different retail dining payees per month from the user's financial data. The resulting number may be normalized or standardized based on the mean and standard deviation for the users of the system (100). The feature encoding engine (144) may encode several features from user phrases and financial data to generate the feature set (146).

The feature set (146) is a set of features generated by the feature encoding engine (144). Each feature in the feature set (146) includes a value that may be generated from an answer from a user (e.g., a spoken phrase, a radio button selection from a website, text from an email, etc.) or extracted from the user's financial data. The feature set (146) may be input to the feature neural network (148).

The feature neural network (148) is a machine learning model that generates the feature personality vector (150) from the feature set (146). The feature neural network (148) may include multiple layers and types of neural networks including convolutional neural networks, recurrent neural networks, translator networks, fully connected networks, etc., which may utilize one or more activation functions. As an example, the feature neural network (148) may include fully connected layers with a final softmax activation layer to identify a personality trait.

The response selection engine (152) is a program that selects a response to a user. The response selection engine (152) may receive inputs that include the input phrase (122), the word vector set (126), the language personality vector (130), the transaction personality vector (140), and the feature personality vector (150). The response selection engine (152) may identify a type of response from the input phrase (122) and the word vector set (126) and then determine the personality style of the response from the language personality vector (130), the transaction personality vector (140), and the feature personality vector (150).

The type of response may be determined from a sequence of phrases that includes phrases from the user and corresponding responses provided by the system (100). For example, in response to a conversation with a user, the system may identify that the user is looking to replace a kitchen. The response selection engine (152) may generate an email response that includes text regarding the kitchen replacement. The response selection engine (152) may select a particular phrase regarding the kitchen based on the personality vectors. When multiple personality vectors are available, the response selection engine (152) may combine the multiple personality vectors into a single personality vector by weighting the different personality vectors. The response selection engine (152) may select the personality style of the response using the personality trait with the largest value from the combined personality vector for a particular user. After selecting the type and personality style of the response, the response selection engine (152) may transmit the response to the user device (109) of FIG. 1C.

Turning to FIG. 1B, the training application (102) is a program that may execute on the server (101) (shown in FIG. 1C). The training application (102) trains the machine learning models used by the system (100). The machine learning models include the language neural network (128), the transaction neural network (138), and the feature neural network (148). Additionally, the language encoding engine (124), the transaction encoding engine (134), the feature encoding engine (144), and the remote selection engine (152) (shown in FIG. 1A) may also include machine learning models that are trained with the training application (102). The training application (102) may retrieve training data from the repository (105) (shown in FIG. 1C) for the machine learning models used by the system, generate outputs from the machine learning models based on the training data, and update the machine learning models based on errors between the output generated from the machine learning models and the expected outputs for the training data.

The training data for the language neural network (128) may include multiple training phrases that each include one or more words. The training phrases may be labeled with personality trait label vectors that identify the personality trait to which the training phrase has the strongest correlation. An initial set of training data may be labeled by hand with a set of training phrases being individually associated with a label for the strongest personality trait. From the labeled training data, the personality trait label vectors are generated and correlated with the training phrases. A personality trait label vector may include an element for each personality trait of the personality model used by the system (100).

The training data for the transaction neural network (138) may include transaction data of a person that has taken a personality test to identify the strongest personality traits of the person in a personality profile. With the personality profiles and transaction data of several people (tens, hundreds, thousands), the training application (102) trains the transaction neural network (138) to match the data from individual transactions to the strongest trait of a personality profile for the person that generated the transaction.

The training data for the feature neural network (148) includes features that have been extracted from training data, which may be the same training data used to train the transaction neural network (138). The features may be labeled with the personality profile of the person that generated the transaction data and be associated with a question. The question may be prompted to person that generated the transaction data and answered. The answer to the question may correlated with the extracted feature and the personality profile.

Turning to FIG. 1C, the system (100) is trained to generate and present messages and responses to users that interact with the system (100) based on the personalities of the users. The system (100) includes the server (101), the repository (105), the developer device (107), and the user device (109). The server (101) may include the training application (102) and the server application (103).

The training application (102) is a program on the server (101). The training application (102) trains the machine learning models of the system (101), as further described in FIG. 1B. The training application (102) may be operated or controlled by the developer device (107) with the developer application (108).

The server application (103) is a program on the server (101). The server application (103) includes multiple programs and machine learning models used by the system (101) to interact with the user device (109), as further described in FIG. 1A.

Figure 4A:
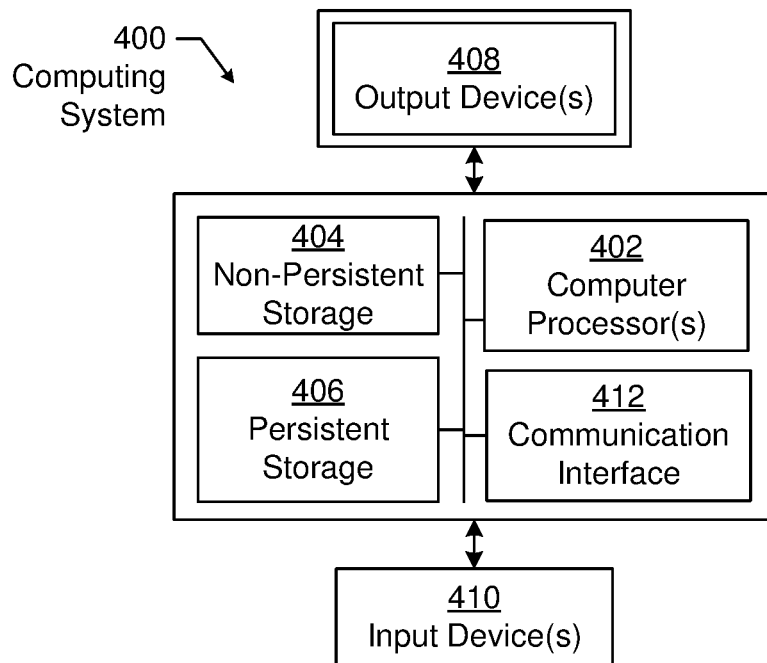
FIG. 4A and FIG. 4B shows a computing system in accordance with one or more embodiments of the invention.
Figure 4B:
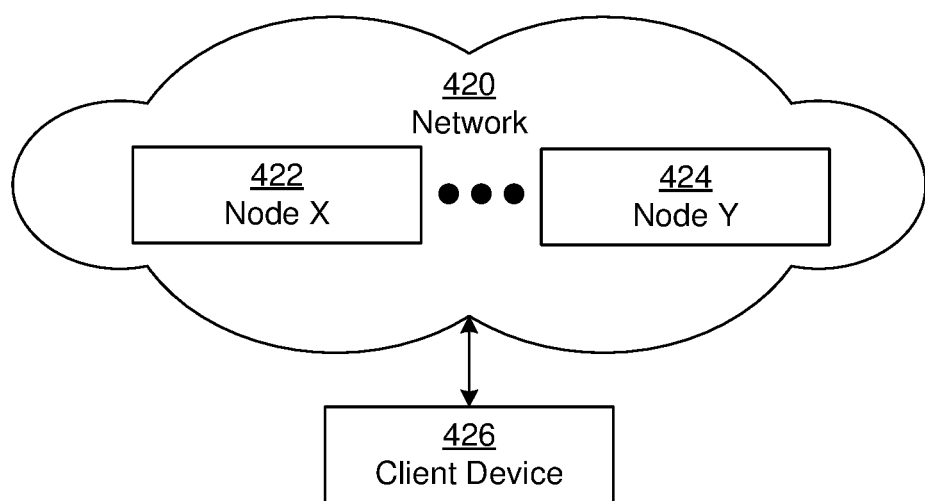

The server (101) is an embodiment of the computing system (400) and the nodes (422) and (424) of FIG. 4A and FIG. 4B. The server (101) may be one of a set of virtual machines hosted by a cloud services provider to deploy the training application (102) and the server application (103) for a financial services provider.

The repository (105) is a computing system that may include multiple computing devices in accordance with the computing system (400) and the nodes (422) and (424) described below in FIGS. 4A and 4B. The repository (105) may be hosted by a cloud services provider for the financial services provider. The cloud services provider may provide hosting, virtualization, and data storage services as well as other cloud services and the financial services provider may operate and control the data, programs, and applications that store and retrieve data from the repository. The data in the repository (105) may include (shown in FIG. 1A) the input phrase (122), the word vector set (126), the language personality vector (130), the transaction data input (132), the transaction vector set (136), the transaction personality vector (140), the feature data input (142), the feature set (146), and the feature personality vector (150). The data in the repository (105) may also include the training data used to train the machine learning models of the system (100), the personality profiles used for training the system, and the web pages that allow for interaction between the users, the developers, and the system (100).

The developer device (107) is an embodiment of the computing system (400) and the nodes (422) and (424) of FIG. 4A and FIG. 4B. The developer device (107) includes the developer application (108) for accessing the training application (102). The developer application (108) may include a graphical user interface for interacting with the training application (102) to control training of the machine learning models of the system (100).

The user device (109) is an embodiment of the computing system (400) and the nodes (422) and (424) of FIG. 4A and FIG. 4B. The user device (109) includes the user application (110) for accessing the server application (103). The user application (110) may include multiple interfaces (e.g., a graphical user interface, a voice interface, etc.) for interacting with the server application (103). A user may operate the user application (110) to perform tasks with the server application (103) to interact with the system (100). The results may be presented by being displayed by the user device (109) in the user application (110) or through an audio output of the user device (109). The user of the user device (109) may be a customer of the financial services provider.

The developer application (108) and the user application (110) may be web browsers that access the training application (102) and the server application (103) using web pages hosted by the server (101). The developer application (108) and the user application (110) may additionally be web services that communicate with the training application (102) and the server application (103) using representational state transfer application programming interfaces (RESTful APIs). Although FIG. 1C shows a client server architecture, one or more parts of the training application (102) and the server application (103) may be local applications on the developer device (107) and the user device (109) without departing from the claimed scope.

Figure 2:
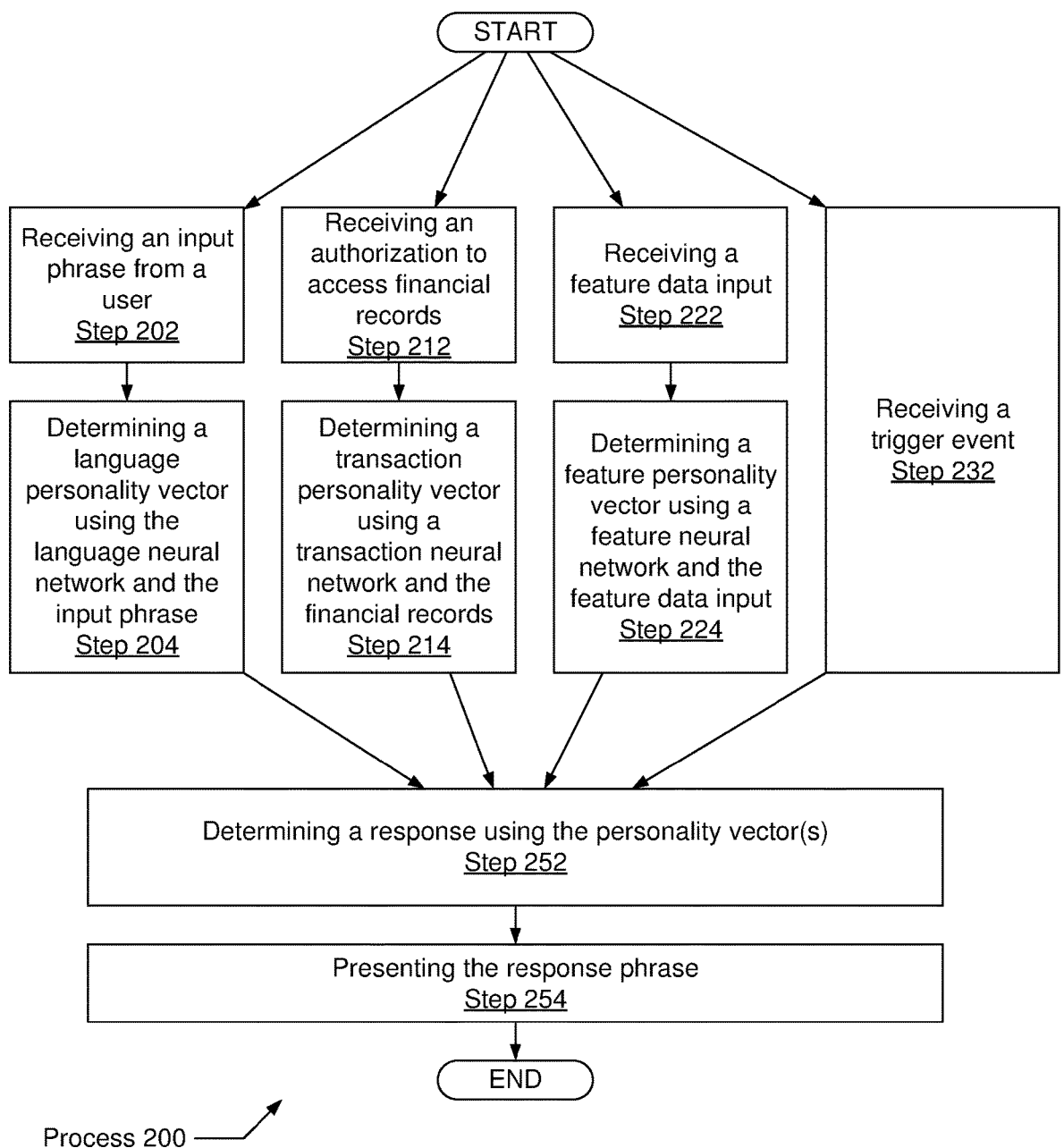
FIG. 2 shows a flowchart in accordance with disclosed embodiments.

FIG. 2 shows a flowchart of the processes (200) in accordance with the disclosure. The process (200) of uses machine learning models to generate personality vectors that are used to determine responses that are presented to a user. The embodiment of FIG. 2 may be combined and may include or be included within the features and embodiments described in the other figures of the application. The features of FIG. 2 are, individually and as an ordered combination, improvements to the technology of computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) receives input from a user that is used to generate personality vectors with neural networks and the personality vectors are used to generate responses to user input.

In Step 202, an input phrase is received from a user. The input phrase may be received from a user device communicatively connected to a server. The input phrase may include text. The text may be from a message sent by the user and may be a transcription of speech input from the user.

In Step 204, a language personality vector is determined using a language neural network and the input phrase. The input phrase may be input to a language encoding engine that outputs a word vector set. The language encoding engine may convert the raw text of the input phrase into the word vector set by filtering the input phrase, splitting the input phrase, and generating embedded word vectors for each word of the input phrase. Filtering the input phrase may include adjusting the case of the letters within the input phrase, removing punctuation, and removing certain words (e.g., "a" and "the"). Splitting the input phrase may convert the text string of the input phrase into an array of text strings with each text string of the array of text strings including a word from the text string of the original input phrase.

Generating embedded word vectors may include, for each text string of the array of text strings, converting the word from the text string to a word identifier, converting the word identifier to a one hot word vector, and converting the one hot word vector to an embedded word vector. The word identifier may be an integer that uniquely identifies the word within a vocabulary of words used and recognized by the system. The embedding values of the embedded word vectors may be pretrained on a generalized vocabulary or may be specially trained with a custom vocabulary. For example, the custom vocabulary may be a corpus of text that includes conversations of people engaging in financial transactions and include the use of terms and phrases that are customary for financial transactions.

The language personality vector scores the set of personality traits of the user based on the input phrase. For example, a language personality vector for the five factor personality model may have a largest value in the element for openness with smaller values for the remaining elements (conscientiousness, extraversion, agreeableness, and neuroticism), which scores the input as indicating that the user may have the personality trait of openness.

The language neural network may be trained by the system with a training application. The training application inputs training phrases, generates predicted language personality vectors, compares the predicted language personality vectors with personality trait label vectors, and updates the machine learning model (the language neural network) based on the comparison.

The training phrases are stored in a repository, retrieved by the training application, converted from text to embedded word vectors, and input to the language neural network. The training phrases may be prelabeled to identify the strongest personality trait associated with a particular phrase. The training phrases may be taken from a corpus that includes poetry.

The language neural network generates the predicted language personality vectors from the training phrases using the word vectors. The language neural network may include several layers that generate intermediate results and an output layer that includes a softmax activation function to predict the personality trait with the strongest correlation to the input phrase.

After generating a predicted language personality vector, the predicted language personality vector is compared to a personality trait label vector using an error function to generate an error signal. The personality trait label vector identifies the "correct" personality trait that should be predicted from the input phrase.

After the comparison, the weights of the language neural network are updated by backpropagating the error signal. The error signal is propagated backwards through the language neural network from the output layer to the input layer. The weights may be updated proportionally to the current value of the weights and the amount of error.

In Step 212, an authorization to access financial records is received. The financial records may be stored by a financial institution that maintains an account of the user and may be for a checking account or debit card of a user. The authorization may be received as part of an application request to a financial services provider (e.g., a request for a loan). In response to receiving the authorization, the financial records of the user may be downloaded and may be for a fixed length of time (e.g., the last 6 months, 12 months, 3 years, etc. of financial records). The financial records may include financial data about transactions. The system may prompt the user for the authorization to access the financial records and verify an account, username, and password of the user for accessing the financial records. After receiving authorization, the financial records may be retrieved from a repository or scraped from a website of the financial institution that maintains the account of the user.

In Step 214, a transaction personality vector is determined using a transaction neural network and the financial records. Transaction data from the financial records may be input to a transaction encoding engine. The transaction encoding engine categorizes the data in the transaction data and forms a transaction vector set. After generating the transaction vector set, the transaction vector set is input to a transaction neural network. The transaction neural network is a machine learning algorithm that processes the transaction vector to classify the transaction data according to the personality traits recognized by the system with a transaction personality vector. The transaction data may be input to a transaction encoding engine that generates a transaction vector used by the transaction neural network. A transaction vector may include elements that identify the payee, amount, day, and hour, which may be identified with multiple categories and unique identifiers. For example, different locations of the same brand of store may use the same payee identifier; amounts may be categorized to different threshold amounts; days may be categorized by day of the week or month; and hour may identify when the purchase took place during the day.

The transaction neural network may be trained by the system with a training application. The training application inputs training financial data, generates predicted transaction personality vectors, compares the predicted transaction personality vectors with personality trait label vectors, and updates the machine learning model (the transaction neural network) based on the comparison.

The training financial data is stored in a repository, retrieved by the training application, converted to transaction vectors, and input to the transaction neural network. Transactions within the training financial data may be prelabeled to identify the strongest personality trait associated with a transaction. The names of certain brands and manufacturers may be associated with certain personality types and labeled accordingly. The training financial data may be taken from a corpus of financial data that includes transactions from multiple account histories of multiple users.

The transaction neural network generates the predicted transaction personality vectors from the training financial data using the transaction vectors. The transaction neural network may include several layers that generate intermediate results and an output layer that includes a softmax activation function to predict the personality trait with the strongest correlation to the training financial data input.

After generating a predicted transaction personality vector, the predicted transaction personality vector is compared to a personality trait label vector using an error function to generate an error signal. The personality trait label vector identifies the "correct" personality trait that should be predicted from the training financial data input.

After the comparison, the weights of the transaction neural network are updated by backpropagating the error signal. The error signal is propagated backwards through the transaction neural network from the output layer to the input layer. The weights may be updated proportionally to the current value of the weights and the amount of error.

In Step 222, feature data input is received. The feature data input may be extracted from the financial records and may be a response from a user. The user response may be predicated by a question from a personality profile questionnaire, or similar test, designed to identify a personality type for the personality model being used by the system. Additionally, a user might be presented with images and asked to select a preferred image. The images may then be correlated with personality types after the personality types of multiple users selecting images has been determined.

The feature data input extracted from the financial records may be received in response to receiving the user's authorization to access the financial records. For the feature data input received in response to the user question, the question may be prompted to a user of the system. The question may be one of multiple questions that are prompted to new users to generate a personality profile and personality vectors, prior to receiving authorization to access a user's financial records.

In Step 224, a feature personality vector is determined using a feature neural network and the feature data input. The feature data input may be one of multiple feature data inputs that form a set of features, referred to as a feature set. A feature encoding engine may generate the feature set from the feature data extracted from financial records and from user responses to questions related to the extracted feature data. The feature set is input to the feature neural network. The feature neural network is a machine learning algorithm that classifies the input (e.g., the feature set) according to the personality traits recognized by the system with the feature personality vector. The feature neural network may use dropout to remove the influence of feature data inputs that are not part of the feature set. For example, a user may not have answered every question related to the feature set and access to the user's financial records may not be authorized.

The feature neural network may be trained by the system with a training application. The training application inputs training feature data, generates predicted feature personality vectors, compares the predicted feature personality vectors with personality trait label vectors, and updates the machine learning model (the feature neural network) based on the comparison.

The training feature data is stored in a repository, retrieved by the training application, converted to a feature set, and input to the feature neural network. Features within the training feature data may be prelabeled to identify the strongest personality trait associated with a feature. The training feature data may be taken from a corpus of financial data that includes features from multiple account histories of multiple users.

The feature neural network generates the predicted feature personality vectors from the training feature data using the feature vectors. The feature neural network may include several layers that generate intermediate results and an output layer that includes a softmax activation function to predict the personality trait with the strongest correlation to the feature set and the training feature data input.

After generating a predicted feature personality vector, the predicted feature personality vector is compared to a personality trait label vector using an error function to generate an error signal. The personality trait label vector identifies the "correct" personality trait that should be predicted from the training feature data input.

After the comparison, the weights of the feature neural network are updated by backpropagating the error signal. The error signal is propagated backwards through the feature neural network from the output layer to the input layer. The weights may be updated proportionally to the current value of the weights and the amount of error.

In step 232, a trigger event is received. The trigger event may be an event identified by the server upon a periodic review of user records. Examples of trigger events include a loan abandonment event identifying that a loan has been abandoned and a usage threshold event identifying that a user has not interacted with the system (e.g., visited the website, used the mobile application, called customer service, etc.) within a threshold amount of time (e.g., within the last 30 days). The trigger event may include a code that identifies the type of event, a personality vector of the associated user, and a list of interactions between the associated user and the system.

In Step 252, a response is determined using personality vectors. To determine the response, multiple personality vectors may be used. The response may be determined with a response selection engine that receives language personality vectors, transaction personality vectors, and feature personality vectors. The response selection engine may further receive an input phrase received from a user of the system. When a trigger event initiates the determining of the response, the input phrase may be from the last interaction between the user and the system and retrieved from a repository storing the interactions between the user and the system. The response selection engine may map common responses to common input phrases using a table that includes responses that are customized to the different personality traits. The multiple personality vectors may be combined, such as by weighted averaging, and the personality trait for the selected response may be chosen as the personality trait from the combined personality vector having the highest value. The response may be in the form of a text message, an email, etc.

In Step 254, the response is presented. The response may be presented as text to the user, audio to the user, etc. For example, if the user is engaged in voice call with the system, the selected phrase may be converted to speech that is played for the user. If the user is communicating via text (email, instant messaging, text messaging, etc.) the selected response phrase may be sent back to the user using the same medium of communication. If the user interacts with a website (e.g., fills out an application), the system may present the selected response phrase in an email using a different communication medium.

Figure 3B:
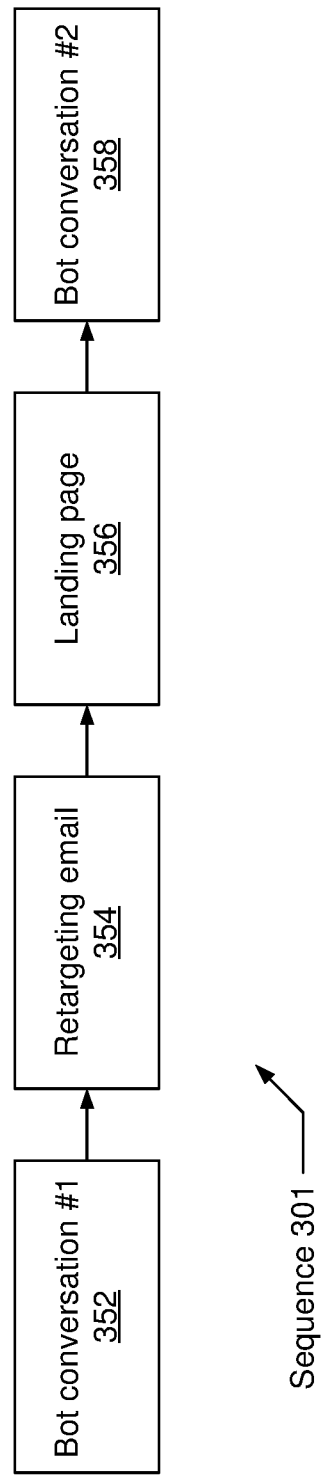

FIG. 3A and FIG. 3B show examples of systems and interfaces in accordance with the disclosure. FIG. 3A shows an example of a lookup table for responses. FIG. 3B shows a sequence diagram of engagement with a user. The embodiments of FIG. 3A and FIG. 3B may be combined and may include or be included within the features and embodiments described in the other figures of the application. The features and elements of FIG. 3A and FIG. 3B are, individually and as a combination, improvements to the technology of computing systems. The various features, elements, widgets, components, and interfaces shown in FIG. 3A and FIG. 3B may be omitted, repeated, combined, and/or altered as shown. Accordingly, the scope of the present disclosure should not be considered limited to the specific arrangements shown in FIG. 3A and FIG. 3B.

Turning to FIG. 3A, the Response Look Up Table (300) includes text that may be presented to a user as part of a response. The response may be a text message, a voice call, and email, etc. and may be triggered by an input from the user or by another trigger event identified by the system. The Response Look Up Table (300) may be stored in a repository and used by a response selection engine to identify a response phrase that is presented to a user. The Response Look Up Table (300) includes the rows (302) through (306), the columns (312) through (316), and the cells (322) through (366).

The rows (302) through (306) correspond to different personality traits and additional personality traits may be used. The row (302) is for "adventure"; the row (304) is for "simplicity"; and the row (306) is for "introvert".

The columns (312) through (316) correspond to different categories of reasons for the users' interaction with the system. For example, a user may interact with the system to apply for a loan for travel, represented by the category of the column (312); for kitchen remodeling, represented by the category of the column (314); for reducing debts, represented by the category of the column (316); etc. Additional columns may be included for additional categories.

A machine learning model may select the response from the Response Look Up Table (300). For example, the response selection engine may include a neural network that takes personality vectors and a user input as the input to the model. The model may include multiple layers with an output layer that outputs a vector of probabilities (one for each possible response and personality). The probabilities may predict the likelihood of a user following up with the selected response.

Turning to FIG. 3B, the sequence (301) includes several interactions with a user. The user may initiate the first bot conversation (352) by calling a financial services provider. The initial conversation may be by instant messaging, voice interaction, etc. In the first conversation (352), the user may indicate a desire to remodel a kitchen and start an application process. For each interaction (e.g., each phrase spoken or text by the user), the system may generate a personality vector. Multiple personality vectors may be generated and combined to identify the significant personality traits of the user.

The retargeting email (354) may be generated and sent by the system after the conversation (352). The retargeting email (354) may include one or more phrases selected based on the personality traits identified for the user from the conversation (352). For example, the retargeting email (354) may include the phrase "Treat yourself and wow your neighbors with an on-trend kitchen." from the cell (324) of the Response Look Up Table (300) of FIG. 3A for a user identified as having the personality trait of adventure from the row (302) of the Response Look Up Table (300) of FIG. 3A. The retargeting email (354) may include a link to the landing page (356).

The landing page (356) may be generated by the system in conjunction with the retargeting email (354). Additionally, the landing page (356) may be generated dynamically in response to the user opening the link for the landing page (356) from the retargeting email (354). The landing page (356) may include additional phrases that are selected based on the personality vectors generated from user inputs. The landing page (356) may also include a link for authorizing access to the financial records of the user. Selection of the authorization link may trigger the determination of transaction personality vectors and feature personality vectors based on the financial records.

The second bot conversation (358) may be initiated by the user after the first bot conversation (352). For example, the bot conversation (358) may be triggered by selecting a link included in the retargeting email (354) or the landing page (356). The responses from the system to the user during the bot conversation (358) may be selected and identified using the personality vectors generated with the first bot conversation (352), the retargeting email (354), and the landing page (356).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving an input phrase from a user;
determining a language personality vector using a language neural network and the input phrase, wherein the language neural network is trained by:
inputting training phrases to the language neural network;
generating predicted language personality vectors from the training phrases;
comparing the predicted language personality vectors from the language neural network to personality trait label vectors using an error function to generate an error signal; and
updating weights of the language neural network by backpropagating the error signal;
determining a response phrase to the input phrase using the language personality vector from the language neural network; and
presenting the response phrase.

2. The method of claim 1, wherein the language personality vector scores a set of personality traits of the user based on the input phrase.

3. The method of claim 1, further comprising:
receiving authorization to access financial records of the user;
determining a transaction personality vector from a transaction neural network and the financial records; and
determining the response phrase using the transaction personality vector.

4. The method of claim 1, further comprising:
receiving feature data input from the user;
determining a feature personality vector from a feature neural network and the feature data input; and
determining the response phrase using the feature personality vector.

5. The method of claim 1, further comprising:
inputting the input phrase to a language encoding engine that generates a word vector set from the input phrase; and
inputting the word vector set to the language neural network that generates the language personality vector from the word vector set.

6. The method of claim 1, further comprising:
inputting one or more of the input phrase and a word vector set with the language personality vector to a response selection engine that generates the response phrase using the one or more of the input phrases and the word vector set with the language personality vector.

7. A method comprising:
receiving authorization to access financial records of a user;
determining a transaction personality vector using a transaction neural network and the financial records, wherein the transaction neural network is trained by:
inputting training financial data to the transaction neural network;
generating predicted transaction personality vectors from the training financial data;
comparing the predicted transaction personality vectors from the transaction neural network to personality trait label vectors using an error function to generate an error signal; and
updating weights of the transaction neural network by backpropagating the error signal;
determining a response phrase using the transaction personality vector; and
presenting the response phrase.

8. The method of claim 7, wherein the transaction personality vector scores a set of personality traits of the user based on the financial records.

9. The method of claim 7, further comprising:
determining a language personality vector using a language neural network and an input phrase; and
determining the response phrase to the input phrase using the language personality vector from the language neural network.

10. The method of claim 7, further comprising:
receiving feature data input from the user;
determining a feature personality vector using a feature neural network and the feature data input; and
determining the response phrase using the feature personality vector.

11. The method of claim 7, further comprising:
inputting transaction data input from the financial records to a transaction encoding engine that generates a transaction vector set from the transaction data input; and
inputting the transaction vector set to the transaction neural network that generates the transaction personality vector from the transaction vector set.

12. The method of claim 7, further comprising:
inputting one or more of an input phrase and a word vector set with the transaction personality vector to a response selection engine that generates the response phrase using the one or more of the input phrases and the word vector set with the transaction personality vector.

13. A method comprising:
receiving a feature data input;
determining a feature personality vector using a feature neural network and the feature data input, wherein the feature neural network is trained by:
inputting training feature data inputs to the feature neural network;
generating predicted feature personality vectors from the training feature data inputs;
comparing the predicted feature personality vectors from the feature neural network to personality trait label vectors using an error function to generate an error signal; and
updating weights of the feature neural network by backpropagating the error signal;
determining a response phrase to the feature data input using the feature personality vector from the feature neural network; and
presenting the response phrase.

14. The method of claim 13,
wherein the feature personality vector scores a set of personality traits of a user based on the feature data input,
wherein the feature data input is generated from one of an answer phrase and a financial data feature,
wherein the answer phrase is from the user in response to a feature question, and
wherein the financial data feature is extracted from financial records of the user and is responsive to the feature question.

15. The method of claim 13, further comprising:
receiving an input phrase from a user;
determining a language personality vector using a language neural network and the input phrase; and
determining the response phrase to the input phrase using the language personality vector from the language neural network.

16. The method of claim 13, further comprising:
receiving authorization to access financial records of a user;
determining a transaction personality vector from a transaction neural network and the financial records; and
determining the response phrase using the transaction personality vector.

17. The method of claim 13, further comprising:
inputting the feature data input to a feature encoding engine that generates a feature vector set from the feature data input; and
inputting the feature vector set to the feature neural network that generates the feature personality vector from the feature vector set.

\* \* \* \* \*